US008654672B1

(12) United States Patent
Nicholas et al.

(10) Patent No.: US 8,654,672 B1
(45) Date of Patent: Feb. 18, 2014

(54) METHOD FOR OPTIMAL TRANSMITTER PLACEMENT IN WIRELESS MESH NETWORKS

(75) Inventors: Paul J. Nicholas, Stafford, VA (US); David L. Alderson, Jr., Monterey, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 379 days.

(21) Appl. No.: 12/772,434

(22) Filed: May 3, 2010

Related U.S. Application Data (60) Provisional application No. 61/174,819, filed on May 1, 2009.

(51) Int. Cl.
| H04L 12/28 | (2006.01) |
| G06F 7/60 | (2006.01) |
| G06F 17/10 | (2006.01) |
| H04Q 1/20 | (2006.01) |
| H04L 12/24 | (2006.01) |
| H04L 12/56 | (2011.01) |

(52) U.S. Cl.
CPC .......... *H04Q 1/20* (2013.01); *H04L 41/12* (2013.01); *H04L 45/02* (2013.01); *H04L 45/04* (2013.01); *H04L 41/04* (2013.01)
USPC .............. 370/254; 370/400; 703/2; 703/13; 703/22; 703/23; 703/27

(58) Field of Classification Search
CPC .......... H04Q 1/20; H04L 41/12; H04L 45/02; H04L 45/04; H04L 41/04
See application file for complete search history.

(56) References Cited

U.S. PATENT DOCUMENTS

| 2004/0236547 A1* | 11/2004 | Rappaport et al. ............... 703/2 |
| 2008/0175173 A1* | 7/2008 | Ross et al. ............... 370/256 |
| 2009/0285124 A1* | 11/2009 | Aguirre et al. ............... 370/255 |

OTHER PUBLICATIONS

Nicholas, P., "Optimal Transmitter Placement in Wireless Mesh Networks," Master's Thesis, Jun. 2009, Naval Postgraduate School, Monterey, CA.
He, J. Verstak, A., Watson, L., Stinson, C., Ramakrishnan, N., Shaffer, C., Rappaport, T., Anderson, C., Bae, K., Wan, J., Tranter, W., "Globally Optimal Transmitter Placement for Indoor Wireless Mesh Networks," IEEE Transactions on Wireless Communications, 2004, vol. 3, No. 6, pp. 1906-1911.
Jones, D.R., Perttunen, C.D., Stuckman, B.E., "Lipschitzian Optimization Without the Lipschitz Constant," Journal of Optimization Theory and Applications, 1993, vol. 79, No. 1., pp. 157-181.
Xiao, L., Johansson, M., Boyd, S., "Simultaneous Routing and Resource Allocation Via Dual Decomposition," IEEE Transactions on Communications, 2004, vol. 52, pp. 1136-1144.

* cited by examiner

*Primary Examiner* — Hassan Phillips
*Assistant Examiner* — Lonnie Sweet
(74) *Attorney, Agent, or Firm* — Naval Postgraduate School; Lisa A. Norris (57) ABSTRACT

A process for forming a wireless mesh network (WMN) in which client coverage is calculated using a point-to-point propagation loss model and optimal routing and power allocation is determined to quantify the value of network flow. In one embodiment, the process calculates loss based on access point locations, operating characteristics and terrain and environment information. In one embodiment, the network flow and coverage subproblem values are combined via a penalty function. The process creates WMN topologies that maximize client coverage area by choice of access point locations, subject to constraints on network flow and power allocation, number and technical capabilities of access points, background and environmental noise, and radio propagation over terrain.

2 Claims, 5 Drawing Sheets

Infrastructure Mesh
FIG. 1

Client Mesh
FIG. 2

Hybrid Mesh
FIG. 3

METHOD FOR OPTIMAL TRANSMITTER PLACEMENT IN WIRELESS MESH NETWORKS

CROSS-REFERENCE TO RELATED APPLICATIONS

This application claims the benefit of U.S. Provisional Application No. 61/174,819, filed May 1, 2009, which is hereby incorporated in its entirety by reference.

BACKGROUND OF THE INVENTION

1. Field of the Invention

This invention relates generally to communications systems and particularly to wireless mesh networks. Still more particularly this invention relates to a method for quickly and optimally designing a wireless mesh network.

2. Description of the Related Art

Wireless mesh networks (WMNs) are systems of wireless access points (APs) interconnected in a mesh to provide digital services to client devices via radio transmission. These client devices typically are laptop computers, personal digital assistants (PDAs), sensor systems, or other electronic devices requiring network connectivity. WMNs support any type of digital communication, including email, Internet access, file transfer, and voice communication, and they can transmit this information rapidly, reliably, and efficiently.

WMNs can be deployed and configured to fulfill communications requirements, and they have several characteristics that make them particularly well suited to austere environments (i.e., scenarios where communications infrastructure is seriously degraded, destroyed or non-existent). These characteristics include the ability to reroute traffic dynamically when APs are lost or added to the network and the ability to operate with no infrastructure other than a local power source (such as a battery or small generator). Unlike devices connected to wireless local area networks (WLANs) or "hotspots," clients on WMNs are free to roam from the coverage area of one wireless AP to another without loss of service.

Military and civilian organizations can benefit from the advantages provided by WMNs. The Enhanced Company Operations (ECO) concept of the United States Marine Corps (USMC) relies on separation and coordination of tactical units to gain an advantage over the enemy. This concept requires voice, data, and surveillance fused into a single common operating picture. Tactical units must gravitate from push-to-talk radio systems to mobile ad hoc mesh networking. WMNs can quickly and securely relay time-critical information such as intelligence reports, tactical orders, and location sensor readings to separated small units in support of ECO.

The Department of Homeland Security (DHS) requires that the public safety community have the ability to communicate and share information as authorized when it is needed, where it is needed, and in a mode or form that allows the practitioners to effectively use it. Data communications are becoming increasingly important to public safety practitioners to provide the information needed to carry out their missions. During humanitarian assistance and disaster relief (HA/DR) operations, WMNs can provide maps, floor plans, video surveillance, emergency aid requests, and other critical information to personnel.

The physical topology (i.e., the locations of the wireless APs) of a WMN is critical to its performance. Network engineers must place and configure wireless APs to provide service to clients in desired areas, while meeting restrictions on number, placement, and characteristics of APs, as well as requirements for coverage, bandwidth, and other service standards. Consideration must also be given to the effects of terrain and other aspects of the operating environment on radio wave propagation. Because combat and HA/DR operations are highly time-sensitive, the WMN must be designed quickly and with as little guesswork as possible.

A wireless mesh network comprises fixed APs that use separate radio systems to provide two levels of network connectivity (herein the term access point is used generically for any type of wireless mesh transmitter or base station device). The fixed position of APs differentiates WMNs from so-called "ad hoc" networks, where APs can be constantly moving. The first connectivity level of a WMN supports AP-to-AP communication, providing the backhaul radio network that routes traffic from source to destination. The second level supports AP-to-client radio communication. Client devices, such as laptops, PDAs, sensors, or other electronic devices, can be mobile within the WMN client coverage area. While a client device is roaming within a contiguous coverage area, APs may seamlessly "hand off" the client to a more appropriate AP without loss of client network connectivity. WMNs may connect to an outside network or the Internet through a gateway (including via a satellite uplink).

Figure 1:
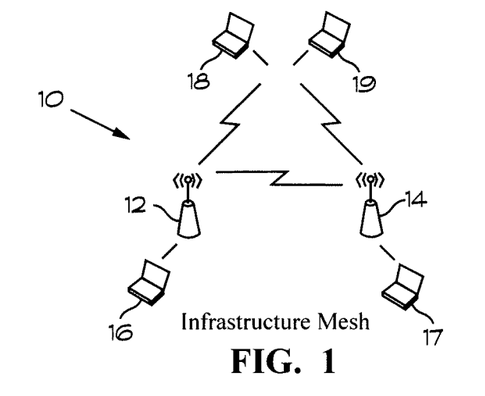
FIG. 1 illustrates a simple infrastructure wireless mesh network.
Figure 2:
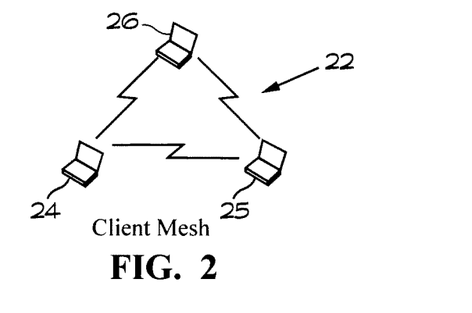
FIG. 2 illustrates a client wireless mesh network.
Figure 3:
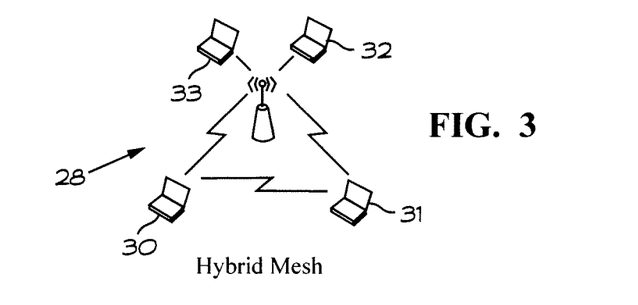
FIG. 3 illustrates a hybrid wireless mesh network.

There are three different types of WMN architecture as shown in FIGS. 1-3. FIG. 1 shows an infrastructure mesh WMN 10 that includes a plurality of access points 12 and 14 and a plurality of client devices 16-19. Client devices 16-19 communicate to a single AP 12 or 14 at a time, and hence do not route traffic. FIG. 2 shows a client mesh WMN 22 that has client devices 24-26 with no dedicated APs. Each client device 24-26 serves as both a user terminal and as an AP, routing traffic directly to other client devices. FIG. 3 shows a hybrid mesh WMN 28 that includes both a traditional AP and client devices 30-33 that are capable of serving as APs. This invention is concerned with mesh architectures in which wireless APs alone provide traffic routing services; clients do not perform any routing. Additionally, it is assumed that each AP, once positioned, will remain stationary.

Prior design techniques fail to provide suggested wireless AP locations with any assurance of a good solution. Essentially, engineers typically design WMNs based on experience and trial-and-error using limited support tools.

SUMMARY OF THE INVENTION

Embodiments in accordance with the invention provide a method for quickly and optimally designing a wireless mesh network. The invention maximizes client coverage area by choice of access point locations, subject to constraints on network service, quantity and technical capabilities of access points, environmental information, and radio propagation over terrain. The present invention uses a non-differentiable, non-convex, nonlinear optimization problem to quantify the value of a given network and uses a sampling algorithm to quickly find optimized solutions.

In one embodiment, the method is implemented as a decision support tool and is executable on a laptop computer, accepts map data in a generic file format, creates network topologies for virtually any type of terrain and mesh access point device.

The imperative to maximize client coverage creates an incentive to place APs farther away from one another. This reduces or eliminates redundant coverage, and maximizes the area receiving adequate client service from a wireless AP. However, the constraints of network service and AP capabilities create an incentive to place APs nearer each other. This increases AP-to-AP network performance and ensures technical constraints are satisfied. The tension between these competing design goals is the core of the optimization problem.

In accordance with one embodiment, a process for forming a wireless mesh network that includes a plurality of access points arranged to provide radio communications with a plurality of client devices includes: establishing criteria for client coverage and network signal flow for the wireless mesh network; defining an operating region as a topographic area where access points may be placed; selecting an arrangement of access points in the operating region. The process further includes discretizing the operating region into a grid, defining coverage regions within the grid where client coverage is desired, and defining a minimum coverage threshold for each coverage region for a client to connect to an access point in the operating region. The process additionally includes calculating client coverage at each coverage region, comparing calculated client coverage to the minimum coverage threshold for each coverage region, determining optimal signal routing and power allocation for each access point to determine values for network signal flow, and comparing the calculated client coverage and network signal flow to the established criteria. If the established criteria are not met, the invention includes selecting a new arrangement of access points and repeating the operations necessary for comparing the new calculated client coverage and network signal flow to the established criteria.

In one embodiment, the process further includes establishing a stopping criterion for ending the process. In one embodiment, a stopping criterion is a selected number of iterations.

Embodiments in accordance with the invention are best understood by reference to the following detailed description when read in conjunction with the accompanying drawings.

DETAILED DESCRIPTION OF THE INVENTION

In accordance with one embodiment, the process of maximizing client coverage in a WMN is divided into two major subproblems. The first subproblem calculates client coverage using the Terrain Integrated Rough Earth Model (TIREM) (Alion Science and Technology Corporation, 2007), given AP locations, operating characteristics, and terrain and environment information. The second subproblem determines the optimal routing and power allocation scheme to quantify the value of network flow, solved using Simultaneous Routing and Resource Allocation (SRRA) techniques. After combining the SRRA and coverage subproblems via a penalty function, the overall formulation is referred to as SRRA+C. SRRA+C is a non-differentiable, non-convex, nonlinear optimization problem. A DIviding RECTangles (DIRECT) algorithm is used to iteratively sample the SRRA+C objective function in pursuit of an optimal solution. In one embodiment, the process is embodied as a decision support tool executed on a laptop computer, and accepts map data in a generic file format that is widely available on the Internet, creates network topologies for virtually any type of terrain and mesh AP device.

Client Coverage Area

Various techniques exist for quantifying and valuing client coverage area. For example, an area can be considered covered if it receives a signal strength greater than a certain threshold, if it supports a certain amount of client demand, or if it satisfies other criteria. The value of coverage can be determined by the worth assigned to a particular client or area, by surface area, or by other metrics.

Depending on the particular metric, greater coverage can be achieved by utilizing techniques similar to increasing network throughput: transmitting more power or at a higher frequency, or utilizing a larger bandwidth or a more complex modulation scheme. It can also be achieved by placing APs in elevated, central locations where radio emissions have a greater chance of being received, and by placing APs farther from each other to increase the total covered area.

Solution Approach

Figure 4:
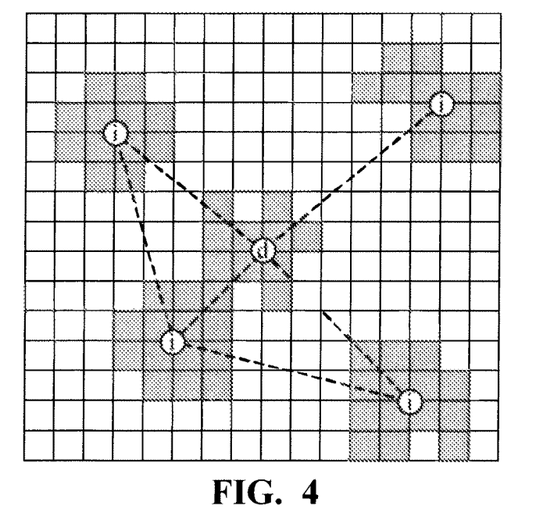
FIG. 4 illustrates discretizing of the operating area of a WMN in accordance with one embodiment.
Figure 5:
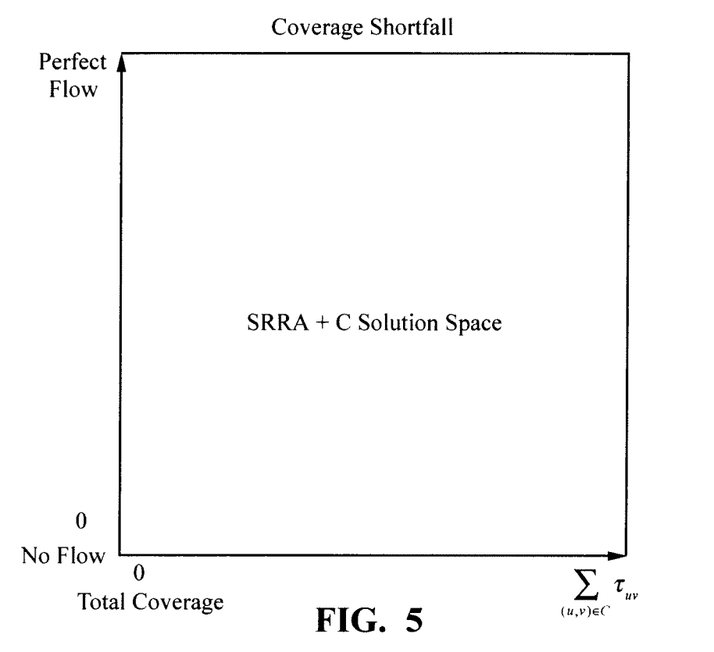
FIG. 5 illustrates boundaries of the SRRA+C solution space in accordance with one embodiment.

Referring to FIG. 4, an operating region is defined as the topographic area where the user may place APs. The operating region is discretized into a grid $(u, v) \in G$ where $u=1, 2, \ldots U$, $v=1, 2, \ldots V$. Each $(u, v) \in G$ ordered pair denotes a discrete area with a corresponding elevation in meters $E_{uv}$. The set C (where $(u, v) \in C \subset G$) is defined as the coverage region, that area within the operating region where client coverage is specifically desired. An indexed set $i \in N$ is defined where N is the set of all AP nodes $\{1, 2, \ldots n\}$. It is assumed that the network can be represented as a mesh of AP nodes i emanating from a single central node $d \in N$, also referred to as the gateway or headquarters node. It is also assumed that the gateway node is the first node in the set N, and its position is fixed in advance. Once an AP has been placed, it is assumed to remain stationary.

Each AP has two radios: one to provide client coverage (gray area), and the other to enable a backhaul network between nodes (dashed lines). Without loss of generality, it is assumed APs are not subject to interference from other APs.

The vast majority of client network traffic will be directed to or from the gateway node d, as this location will connect to the Internet or other outside network, and will house email, domain, and storage servers. Traffic directly between AP nodes is permitted; and it is assumed that the nodes will route this traffic dynamically. Hence, the network is optimized for traffic flow from client service areas to the gateway node.

Client Coverage

The user defines the coverage region(s) $(u, v) \in C \subset G$ and the minimum signal strength required for a client to connect to an AP in that region. Client devices and associated network demand are distributed uniformly within the defined coverage region. The objective is to maximize total client coverage within the desired region. In one embodiment, client devices will connect to only one AP at any point in time, and each AP can support the client devices within its coverage region.

The present invention determines client coverage by a method, e.g., process, that calculates the received signal strength (RSS) at each discrete coverage location $(u, v) \in C$. Received signal strength $\rho$ at coverage region $(u, v)$ from node $i$ in dBm is calculated using a standard link budget formula:

$$\rho_{uv}{}^i = P_{tx} + g_{tx} - L_{tx} - L_{fs} - L_m + g_{rx} - L_{rx} \quad (1)$$

where $P_{tx}$ is transmitted power in dBm, $g_{tx}$ and $g_{rx}$ are respectively the gains of the AP and receiver in dBi, $L_{tx}$ and $L_{rx}$ are respectively the losses (i.e., from cables, connectors, etc.) of the AP and receiver in dB, $L_{fs}$ is free space loss in dB, and $L_m$ is miscellaneous loss (such as fade margin) in dB. Transmission power between any two APs is defined as a decision variable, and gains, equipment losses, and fade margins as data. As all terms are in decibel form, and the $P_{tx}$ term is a logarithmic function of power in watts, this function is monotonic increasing in $P_{tx}$.

The formulation allows any of a wide variety of methods of computing free space loss $L_{fs}$. This invention uses three common methods. The first method computes loss using an inverse-square law. The loss is simply the inverse of the distance squared. While this method captures some aspect of the diffusion of radio wave power over distance, it is not an accurate method of determining loss and is used simply for testing purposes.

The second method of determining free space loss is through the Hata COST-231 model for radio propagation:

$$L = 46.3 + 33.9 \log f - 13.82 \log h_S - C_H + (44.9 - 6.55 \log h_S) \log 1000d + C$$

where $L$ is median path loss in dB, $f$ is transmission frequency in megahertz, $h_S$ is sender effective height in meters, $d$ is distance in meters, $C$ is a constant in dB (0 for medium cities and suburban areas, 3 for metropolitan areas), and $C_H$ is the receiver antenna height correction factor:

$$C_H = 0.8 + (1.1 \log f - 0.7) h_R - 1.56 \log f$$

for small and medium cities and $$C_H = \begin{cases} 8.29(\log(1.54 h_R))^2 - 1.1, & \text{if } 150 \le f \le 200 \\ 3.2(\log(11.75 h_R))^2 - 4.97, & \text{if } 200 \le f \le 1500 \end{cases}$$

for large cities, where $h_R$ is receiver antenna height in meters. This method provides a good approximation of propagation loss and is computationally very quick. However, it does not specifically account for path obstructions, i.e., it does not consider terrain, and it is valid for frequencies between 1.5 and 2.0 GHz.

A third method utilizes the Terrain Integrated Rough Earth Model (TIREM) of Alion Science & Technology Corporation. This commercial tool is the same propagation method used in the Marine Corps' SPEED tool and other commercial planning tools such as the Satellite Toolkit of Analytical Graphics, Inc. (2009). The model utilizes terrain information to compute a path profile between sender and receiver, sampling terrain elevation at a given frequency. This path profile is then used to compute propagation loss, considering the effects of free space loss, diffraction around obstacles, and atmospheric absorption and reflection. The TIREM method also considers the following variables:

Transmission frequency;

Transmitter and receiver antenna gain, height, and polarization;

Conductivity of the earth's surface;

Surface humidity;

Relative permittivity of the earth's surface; and

Surface refractivity.

The model has a wide range of valid input values; for example, frequency can vary between 1 MHz and 20 GHz; and antenna height can vary between ground level and 30 kilometers. While this method is the most accurate of the three, it is also the most computationally expensive.

Calculating the Value of Client Coverage

In principle, the value of client coverage can be computed as a simple sum of the number of discrete regions that receive a minimal threshold of service. In this fashion, each region would or would not be covered, indicated by a binary decision variable. This method is simple to understand, but the binary decision variables greatly increase computational complexity.

In one embodiment, to avoid creating a mixed integer program, the present invention uses the concept of power coverage. Each coverage region (which need not be contiguous) has a minimum coverage threshold $\tau_{uv}$ in watts. Any received signal above this threshold results in useable client coverage. For each $(u, v) \in C$, calculate $\rho_{uv}{}^i$, the actual received signal strength from node $i$ using Equation (1). The difference of $\rho_{uv}{}^i$, (converted to watts) and $\tau_{uv}$ represents a quantity defined as coverage shortfall at region $(u, v)$ from node $i$. Coverage shortfall should be minimized: a positive difference represents inadequate power coverage. Additionally, regions where greater network demand is expected can be indicated (or a region of greater importance) by utilizing larger threshold values $\tau_{uv}$. Summarizing, $$(\text{Coverage Shortfall})_{uv}{}^i = (\tau_{uv} - \rho_{uv}{}^i).$$

As each client device can connect to only one AP at any point in time, in one embodiment, only the minimum coverage shortfall calculated from each node I is considered. Only positive terms are allowed to remove any benefit of "blasting" a particular region with power. This yields:

$$(\text{Coverage Shortfall})_{uv} = \min(\tau_{uv} - \rho_{uv}{}^i)_+$$

where $(\tau_{uv} - \rho_{uv}{}^i)_+$ denotes the projection onto the nonnegative orthant. To find the coverage shortfall for all possible coverage grid squares $(u, v) \in C$, the sum is taken over all $(u, v) \in C$. This yields total coverage shortfall:

$$(\text{Total Coverage Shortfall}) \equiv \sum_{(u,v) \in C} \min(\tau_{uv} - \rho_{uv}^j)_+. \quad (2)$$

This measure avoids double counting when a particular $(u, v) \in C$ receives more than $\tau_{uv}$ from more than one AP. It also bounds the amount any region can be penalized to no more than $\tau_{uv}$.

Total coverage shortfall is used in the present formulation. Other coverage objectives could involve average coverage shortfall (obtained by dividing by the cardinality of the set of all coverage grid squares $C$), and maximum coverage shortfall:

$$(\text{Average Coverage Shortfall}) \equiv \frac{1}{|C|} \sum_{(u,v) \in C} \min(\tau_{uv} - \rho_{uv}^i)_+$$

$$(\text{Maximum Coverage Shortfall}) \equiv \max[\min(\tau_{uv} - \rho_{uv}^i)_+].$$

Network Routing and Resource Allocation

A network flow problem is formulated to maximize the delivered traffic in bits per second (bps) from any node i to the HQ node, given constraints on communications resources. Arc capacities between each node are calculated and then used in the network problem.

Calculating Arc Capacities

In addition to calculating client coverage, the flow of traffic between AP nodes is calculated as a measure of network performance. These flows are optimized using a network flow problem, maximizing the flow in the network from any node i to the gateway (HQ) node.

Flow maximization requires as input arc capacities between AP nodes. In computing arc capacity it is possible to ignore many of the effects of a particular device's actual hardware and software characteristics by using a capacity formula that establishes a theoretical upper bound on radio link capacity in bits per second:

$$(\text{Capacity})_{ij} = B \log_2\left(1 + \frac{\text{Signal}_{ij}}{b_{ij}}\right) \forall (i,j) \in A \quad (3)$$

where B is the channel bandwidth in hertz, and $\text{Signal}_{ij}$ and $b_{ij}$ are respectively the signal power and background noise power in watts or volt$^2$ from node i to node j. To calculate the received signal capacity, the Signal term is calculated using the antilog of the link budget formula (Equation 1), which yields:

$$(\text{Capacity})_{ij} = B \log_2\left(1 + \frac{g_{ij}}{b_{ij} l_{ij}} P_{ij}\right) \forall (i,j) \in A \quad (4)$$

where $g_{ij}$ is the sum of the antilog gain terms, $l_{ij}$ is the sum of the antilog loss terms, and $P_{ij}$ represents the fraction of a finite resource (in this case, transmission power in watts) used to transmit from i to j. It is assumed that $$\sum_{j:(i,j) \in A} P_{ij} \leq p, \quad (5)$$

which means that the sum of all resource fractions is less than or equal to a constant representing the total available resource.

Calculating the Value of Delivered Network Flow

Individual traffic flow is measured in bits per second. However, the value of all flows across the network needs to be assessed. One approach is to simply compute the sum of all delivered traffic from all APs to the HQ node. Let $S_i^d$ be the total flow of traffic from source node i∈N to destination node d∈D. Then $$(\text{Total Network Flow}) \equiv \sum_d \sum_{i \neq d} (S_i^d).$$

In this case, all traffic is valued equally, independent of other traffic levels. As long as the total volume of traffic is large; it doesn't matter which source-destination pairs are passing traffic (or not).

An alternate approach is to consider the utility of delivered traffic by using a log-utility function that places a zero value on unit flow, positive values on flows greater than one, and negative values on flows less than one:

$$(\text{Utility of Total Network Flow}) \equiv \sum_d \sum_{i \neq d} \log_2(S_i^d).$$

This utility function promotes fairness between flows: the penalty for small flows encourages the assignment of at least unit flow to all source-destination pairs.

Simultaneous Routing & Resource Allocation Formulation

In one embodiment, this invention uses a Simultaneous Routing and Resource Allocation (SRRA) technique to calculate a value of network flow. The goal is to maximize the utility of network flow from each node to the central HQ node. It is assumed AP locations are given, the communications terms $g_{ij}$ and $l_{ij}$ are pre-calculated, and total transmission resource p is a fixed quantity representing transmission power in watts available at each AP.

SRRA Formulation

Index Use i∈N node (alias j, k)
(i, j)∈A arc (link)
d∈D ⊆ N destination node

| Calculated Data | | |
|---|---|---|
| $g_{ij}$ | product of antilog gain terms from i ∈ N to j ∈ N | [none] |
| $l_{ij}$ | product of antilog loss terms from i ∈ N to j ∈ N | [none] |
| $p_i$ | maximum total transmission power per node | [watts] |
| B | channel bandwidth | [hertz] |
| $b_{ij}$ | background noise power from i ∈ N to j ∈ N | [watts] |
| Decision Variables | | |
| $S_i^d$ | total flow of traffic from i ∈ N to destination d ∈ D | [flow] |
| $X_{ij}^d$ | traffic flow along arc (i, j) ∈ A to destination d ∈ D | [flow] |
| $T_{ij}$ | total flow vector along arc (i, j) ∈ A | [flow] |
| $P_{ij}$ | total transmission power along arc (i, j) ∈ A | [watts] |

Formulation $$\max_{S,X,T,P} \sum_d \sum_{i \neq d} \log_2(S_i^d) \quad (S0)$$

s.t.

$$\sum_{k:(j,k) \in A} X_{jk}^d - \sum_{i:(i,j) \in A} X_{ij}^d = S_j^d \quad \forall j \in N, \forall d \in D \quad (S1)$$

$$T_{ij} = \sum_d X_{ij}^d \quad \forall (i,j) \in V \quad (S2)$$

-continued $$T_{ij} - B\log_2\left(1 + \frac{g_{ij}}{b_{ij}l_{ij}}P_{ij}\right) \leq 0 \quad \forall\, (i,j) \in A \quad (S3)$$

$$\sum_{j:(i,j)\in A} P_{ij} \leq p_i \quad \forall\, i \in N \quad (S4)$$

$$P_{ij} \geq 0 \quad \forall\, (i,j) \in A \quad (S5)$$

$$X_{ij}^d \geq 0 \quad \forall\, (i,j) \in A, \forall\, d \in D \quad (S6)$$

$$T_{ij} \geq 0 \quad \forall\, (i,j) \in A \quad (S7)$$

$$S_i^d \geq 0 \quad i \neq d \quad (S8)$$

The objective function (S0) maximizes the sum of utilities for each traffic flow. Constraint (S1) ensures balance of flow at each node. Constraint (S2) defines the total flow along any arc to equal the sum of all traffic flows along that arc. Constraint (S3) ensures traffic flow along any arc is less than or equal to the capacity of that arc. Constraint (S4) bounds total transmission power per AP by available resource. Constraints (S5-S8) ensure non-negativity.

Dual Decomposition Technique

Due to its layered structure (i.e., the routing and resource allocation decisions), this problem can be solved via dual decomposition. By introducing the Lagrange multipliers $\alpha_{ij}\,\forall\,(i,j)\in A$ for the routing and resource allocation constraint (S3), obtain the partial Lagrangian:

$$L(S, X, T, P, \alpha) = \qquad (6)$$
$$\sum_d \sum_{i \neq d} \log_2(S_i^d) - \sum_{(i,j)\in A} \alpha_{ij}\left(T_{ij} - B\log_2\left(1 + \frac{g_{ij}}{b_{ij}l_{ij}}P_{ij}\right)\right).$$

The choice of $\alpha$ is minimized:

$$\min_\alpha L(S, X, T, P, \alpha).$$

The objective function of the dual problem can then be evaluated via the network flow variables S, X, and T, and the communications variable P:

$$V(\alpha) = V_{flow}(\alpha) + V_{comm}(\alpha) \qquad (7)$$

$$V_{flow}(\alpha) = \max_{S,X,T} \sum_d \sum_{i\neq d} \log_2(S_i^d) - \sum_{(i,j)\in A} \alpha_{ij}T_{ij} \qquad (8)$$

$$V_{comm}(\alpha) = \max_P \sum_{(i,j)\in A} \alpha_{ij} B\log_2\left(1 + \frac{g_{ij}}{b_{ij}l_{ij}}P_{ij}\right) \qquad (9)$$

The representation of the capacity constraint (Equation 4) is a logarithmic function and hence is a concave and monotone increasing capacity function. It is also assumed that:

$$T_{ij} < B\log_2\left(1 + \frac{g_{ij}}{b_{ij}l_{ij}}P_{ij}\right)\forall\,(i,j)\in A \qquad (10)$$

That is, the total flow of traffic along a link is strictly less than the maximum capacity of that link.

Since the objective function of the primal problem is not strictly concave in the variables X and T, the dual function is only piecewise differentiable, and hence a non-differentiable convex optimization problem. A subgradient method is used to obtain a solution. Similar to the gradient method, this method uses the subgradient rather than the gradient (which may not exist or is too difficult to compute). Each iteration of the subgradient method might not necessarily improve the dual objective value, but each iteration reduces the distance to the optimal solution.

The solution of $V_{flow}(\alpha)$ (Equation 8) is computed via the network flow subproblem, and the solution of $V_{comm}(\alpha)$ (Equation 9) is computed via the resource allocation subproblem.

Network Flow Subproblem

The network flow subproblem (defined below) is solved as a multicommodity flow problem.

$$\max_{S,X,T} \sum_d \sum_{i\neq d} \log_2(S_i^d) - \sum_{(i,j)\in A} \alpha_{ij}T_{ij} \qquad (F0)$$

$$s.t. \sum_{k:(j,k)\in A} X_{jk}^d - \sum_{i:(i,j)\in A} X_{ij}^d = S_j^d \quad \forall\, j\in N, \forall\, d\in D \quad (F1)$$

$$T_{ij} = \sum_d X_{ij}^d \qquad \forall\, (i,j)\in A \quad (F2)$$

$$X_{ij}^d \geq 0 \qquad \forall\, (i,j)\in A, \forall\, d\in D \quad (F3)$$

$$T_{ij} \geq 0 \qquad \forall\, (i,j)\in A \quad (F4)$$

$$S_i^d \geq 0 \qquad i \neq d \quad (F5)$$

The objective function (F0) maximizes the difference of the sum of utilities for each traffic flow and the costs associated with the total flows along each arc. Constraint (F1) ensures balance of flow at each node. Constraint (F2) defines the total flow along any arc to equal the sum of all traffic flows along that arc. Constraints (F3-F5) ensure non-negativity.

By substituting the $T_{ij}$ term in the objective function with $$\sum_d X_{ij}^d,$$

the problem can be solved for each fixed commodity (destination) $\hat{d}$:

$$\max_{S,X,T} \sum_{i\neq d} \log_2\left(S_i^{\hat{d}}\right) - \sum_{(i,j)\in A} \alpha_{ij}X_{ij}^{\hat{d}}$$

$$s.t. \sum_{k:(j,k)\in A} X_{jk}^{\hat{d}} - \sum_{i:(j,k)\in A} X_{ij}^{\hat{d}} = S_j^{\hat{d}} \quad \forall\, j\in N$$

$$X_{ij}^{\hat{d}} \geq 0 \qquad \forall\, (i,j)\in A$$

$$S_i^{\hat{d}} \geq 0 \qquad i \neq \hat{d}$$

The next consideration is the total cost of sending flow over different paths from source node i to destination node d. Let $B_k$ denote the $k^{th}$ path from i to d, and let $Y_k$ denote the total flow sent along path $B_k$. Then $$(\text{Total Cost Per Unit Flow})_{B_k} = \sum_{(i,j) \in B_k} \alpha_{ij}$$

and $$(\text{Total Cost of Flow})_{B_k} = Y_k \sum_{(i,j) \in B_k} \alpha_{ij}.$$

Summing over all paths from i to d, the contribution to the objective function can be rewritten as $$\log_2\left(\sum_k Y_k\right) - \sum_k Y_k \sum_{(i,j) \in B_k} \alpha_{ij}.$$

This objective is maximized when the marginal utility equals the marginal cost. For any path $B_k$, this maximum is reached at the point $$\frac{d}{dY_k} \log_2 Y_k = \sum_{(i,j) \in B_k} \alpha_{ij}.$$

For each source-destination pair (i, d), the optimum solution is to send flow along the shortest (lowest cost) path(s) from i to d. Thus, solving for optimal flows from to d is achieved by calculating the shortest path(s) and solving for first order conditions. Consider two paths $B_1$ and $B_2$ from i to d with respective costs $c_1$ and $c_2$, where $c_1 < c_2$. Flow $Y_1$ should be pushed along path $B_1$ as long as the marginal benefit is greater than the marginal cost, i.e., $$\frac{d}{dY_1} \log_2 Y_1 \geq c_1.$$

The stopping point is reached at equality, as pushing additional flow beyond this point results in greater cost than benefit. Increasing delivered flow along $B_2$ costs at least $c_1$ per unit (since $c_2 > c_1$), and generates marginal benefit no greater than $c_1$. Thus, the optimal solution is to push $Y_1^*$ along path $B_1$. If multiple shortest paths exist (e.g., there exists a path $B_3$ for which $c_3 = c_1$), the optimal solution is to push any convex combination of nonnegative flows totaling $Y_1^*$ along these shortest paths, and no flows along strictly longer paths.

The ability to send flow along multiple shortest paths (if they exist) is required for the problem to converge under the subgradient method. A modification of the Floyd-Warshall algorithm is used that can store all shortest paths from i to d, and the associated path costs are used to solve for the optimal flows $$Y_k^* = S_i^d = \frac{1}{c_k \ln(2)}$$

where $c_k$ is the lowest cost path k, namely, the smallest a between node i and d. If multiple shortest paths do exist for any (i, d), the optimal flow is split evenly among the paths.

The following pseudo-code solves the network flow subproblem.

Algorithm Network Flow

Input: Node and arc adjacency lists; maximum transmit power p; α values for each arc.

Output: Network flow values for all transmission links begin

Calculate arc costs

Calculate all shortest paths for all (i, j)∈A using Floyd-Warshall algorithm for (all (i, d))

Calculate total delivered flow $S_i^d$ from each i∈N to all d∈D     Calculate flow $X_{ij}^d$ along each (i, j)∈A to all d∈D     next (i, d)

end.

The resource allocation subproblem determines transmitted power P and can be expressed as follows:

Resource Allocation Subproblem $$\max_P \sum_{(i,j) \in A} \alpha_{ij} B \log_2\left(1 + \frac{g_{ij}}{b_{ij} l_{ij}} P_{ij}\right)$$

$$\text{s.t.} \sum_{j:(i,j) \in A} P_{ij} \leq p_i \quad \forall\, i \in N$$

$$P_{ij} \geq 0 \quad \forall\, (i, j) \in A$$

The objective function (R0) maximizes the sum of the capacities of each arc. Constraint (R1) bounds total transmission power per AP by available resource. Constraint (R2) ensures non-negativity.

This nonlinear, concave, differentiable problem is solved by using a resource allocation algorithm. The method allows each AP power allocation scheme to be solved separately. Let k=1, 2, . . . R be the set of all adjacent arcs (i, j)∈A to the AP in question. Let $\alpha_k$ and $c_k$ represent the lower and upper bounds of $P_k$. In the above formulation, $\alpha_k = 0$ and $c_k = p_i$. Let $DQ(P_k)$ be the derivative of the objective function at $P_k$.

A necessary and sufficient condition for P* to be an optimal solution is that there exists a Lagrange multiplier M such that:

$$P_k^* = a_k \to DQ(a_k) \leq M \tag{11}$$

$$a_k < P_k^* < c_k \to DQ(P_k^*) = M \tag{12}$$

$$P_k^* = b_k \to DQ(c_k) \geq M \tag{13}$$

$$\sum_{k=1}^R P_k = p_i \quad \forall\, i \in N. \tag{14}$$

Equations 11-13 establish bounds on M based on the optimum value of P. Equation 14 requires the sum of all transmission powers to equal the total possible transmission power, i.e., all available transmission resources are utilized.

If $DQ(\alpha_k) \geq DQ(\alpha_{k+1})$ for k=1, 2, . . . R−1, then there exists an integer q, 1≤q≤R, such that $P_k^* > \alpha_k$, k=1, 2, . . . q, and $P_k^* = \alpha_k$, k=q+1, q+2, . . . R. Reordering the derivatives $DQ(\alpha_k)$ in this manner, ensures $P_k^* > \alpha_k$ (the optimal power allocation is strictly greater than the lower bound of zero) and $DQ(P_k^*)=M(q)$, where $$M(q) = (1/q)\sum_{k=1}^{R} DQ(P_k^*).$$

The optimal solution $P_k^*$ can therefore be found by finding a closed-form expression for $M(q)$. First, solve for $P_k^*$ as a function of $M(q)$. The derivative of the objective function is $$DQ(P_k) = \frac{\alpha_k B \frac{g_k}{b_k l_k}}{\ln(2)\left(1+\frac{g_k}{b_k l_k}P_k\right)} \quad \forall k \in R.$$

Since the derivatives are ordered, $DQ(P_k^*)=M(q)$ and solve for $P_k^*$ as a function of $M(q)$:

$$P_k^* = \frac{\alpha_k B}{\ln(2)M(q)} - \frac{b_k l_k}{g_k} \quad \forall k \in R.$$

To find a closed-form expression for $M(q)$, first simplify the derivative:

$$M(k) = DQ(P_k^*)\frac{\alpha_k B}{\ln(2)\left[P_k^* + \left(\frac{b_k l_k}{g_k}\right)\right]} \quad \forall k \in R.$$

Next, sum over all $k=1, 2, \ldots q$:

$$M(q) = \frac{B\sum_{k=1}^{q}\alpha_k}{\ln(2)\sum_{k=1}^{q}P_k^* + \ln(2)\sum_{k=1}^{q}\left(\frac{b_k l_k}{g_k}\right)}.$$

By the above results, replace $$\sum_{k=1}^{q} P_k^* \text{ with } p_i - \sum_{k=q}^{R} a_k,$$

yielding $$M(q) = \frac{B\sum_{k=1}^{q}\alpha_k}{\ln(2)\left[p_i - \sum_{k=q}^{R}a_k\right] + \ln(2)\sum_{k=1}^{q}\left(\frac{b_k l_k}{g_k}\right)}.$$

Since the lower bound on transmission power $\alpha_k=0$, this expression simplifies to $$M(q) = \frac{B\sum_{k=1}^{q}\alpha_k}{\ln(2)\left[p_i + \sum_{k=1}^{q}\left(\frac{b_k l_k}{g_k}\right)\right]}.$$

To solve for the optimum value of $q$, iteratively increase $q$ by one until the condition $$DQ(\alpha_{k+1}) > M(q)$$

is no longer true, or until $k$ equals the number of adjacent arcs $R$.

The following pseudo-code solves the resource allocation subproblem.

Algorithm Resource Allocation
Input: Node and arc adjacency lists; maximum transmit power p; gain, loss and $\alpha$ values for each arc; channel bandwidth B, background noise b
Output: Power allocations for all arcs
begin
  Reorder derivatives
  Set k=0
  do
    k=k+1
    Calculate M(q)
    if (k<R)
    Calculate $DQ(\alpha_{k+1})$
    end if;
  while ($DQ(\alpha_{k+1}) > M(q)$ and k<R)
  end;
  Calculate $P_k^*$ for all adjacent arcs
end.

Utilizing the Subgradient Method

The subgradient of the non-differentiable convex function $V(\alpha)$ is a vector $h$ such that $$V(\beta) \geq V(\alpha) + h'(\beta-\alpha) \forall \beta.$$

Let $X^*(\alpha)$, $T^*(\alpha)$, and $S^*(\alpha)$ be an optimal solution to the network flow subproblem at $\alpha$, and let $P^*(\alpha)$ be an optimal solution to the resource allocation subproblem at $\alpha$. Then the subgradient $h$ of $V(\alpha)$ is $$h_{ij} = B\log_2\left(1 + \frac{g_{ij}}{b_{ij}l_{ij}}P_{ij}^*(\alpha)\right) - T_{ij}^*(\alpha)$$

where $h_{ij}$ are the components of the subgradient $h$ defined for each $(i,j) \in A$. The subgradient can be interpreted as the excess capacity on each arc.

To solve the dual problem via the subgradient method, select an initial value of $\alpha^1$ $$\left(\text{for example, } \frac{g_{ij}}{b_{ij}l_{ij}}\right),$$

and for each iteration $k=1, 2, 3, \ldots$, compute the dual function $V(\alpha^k)$ and subgradient $h^k$. Update the dual variable $\alpha$ according to $$\alpha^{k+1}(\alpha^k - \delta_k h^k)_+$$

where $\delta_k$ is the step size of iteration k and $(\ )_+$ denotes the projection onto the nonnegative orthant. Use a step size rule of $$\delta_k = \frac{a^k}{\|h_{ij}\|^2}$$

where $$a^k = \frac{1+m}{k+m}$$

and m is a fixed positive integer (for example, use 1000). This step size rule follows the conditions for a diminishing step size, namely $$a^k \to 0, \sum_{k=1}^{\infty} a^k = \infty.$$

In one embodiment, the method is stopped after a given number of iterations (typically 500), and the optimized solution found is used as an approximation of the solution to the SRRA problem (and an estimate of network performance).

SRRA Algorithm

The following pseudo-code solves the simultaneous routing and resource allocation problem using the subgradient method.

Algorithm SRRA
Input: Stopping criteria (max_iterations)
Output: Optimal routing and power allocations for all transmission links
begin
  Select initial α values
  while (k<max_iterations)
    call Algorithm Network Flow (calculates $X_{ij}^d$ values)
    Calculate $$T_{ij} = \sum_d X_{ij}^d \ \forall\ (i,j) \in A$$

Calculate $S_i^d \forall i \in N, \forall d \in D$
    Calculate $$V_{flow}(\alpha) = \sum_d \sum_{i \neq d} \log_2(S_i^d) - \sum_{(i,j) \in A} \alpha_{ij} T_{ij}$$

call Algorithm Resource Allocation (calculates $P_{ij}$ values)
    Calculate $$V_{comm}(\alpha) = \sum_{(i,j) \in A} \alpha_{ij} B \log_2\left(1 + \frac{g_{ij}}{b_{ij} l_{ij}} P_{ij}\right)$$

Calculate $$h_{ij} = B \log_2\left(1 + \frac{g_{ij}}{b_{ij} l_{ij}} P_{ij}\right) - T_{ij}^*(\alpha) \ \forall\ (i,j) \in A$$

Calculate $\delta_k$
    Calculate $\alpha^{k+1} = (\alpha^k - \delta_k h^k)_+$
  end;
end.

SRRA+C Formulation

Weighted Multiple Objective Function

Return now to the overall objective of maximizing coverage area (or more specifically, minimizing coverage shortfall), subject to constraints on number and operating characteristics of APs, network flow requirements, and the operating environment. The DIRECT optimization algorithm (described below) requires the objective function to be continuous; to meet this requirement, enforce a lower bound on network service using a soft constraint. Greater network flow results in greater benefit (i.e., smaller penalty) to the objective function:

(Overall Objective Function)=(Total Coverage Shortfall)−w(Network Flow)

where w is a positive scalar (in units of dBm/log$_2$ bps) representing the relative weight placed on network flow. Larger values of w place more emphasis on network flow, and in general increase the desirability of more compact network topologies. The order of magnitude of w depends on the relative values of coverage shortfall and network flow.

Solve total coverage shortfall using and network flow using the SRRA formulation. Both are functions of AP locations. Let σ be the locations of all APs for a particular network, and let Ω be the overall objective function. Thus, $$\Omega(\sigma) \equiv \sum_{(u,v) \in G} \min(\tau_{uv} - \rho_{uv}^j)_+ - w \max_{S,X,T,R} \sum_d \sum_{i \neq d} \log_2(S_i^d). \quad (15)$$

The SRRA+C problem is to minimize the objective value Ω by choice of AP locations σ. The objective function is in units of dBM, although the combined objective value has no direct practical implication. Rather, the objective value serves as a relative method of comparing different network topologies.

Note that this formulation does not directly relate the values of client coverage and backhaul network flow. This follows from the assumption that all APs have different radio systems to provide client coverage and backhaul connectivity. These radios have separate resource constraints and can utilize different networking algorithms. This implies that a change to client coverage area (even if client distribution is uniform) does not necessarily result in a change to backhaul network flow: APs can have proprietary algorithms that may reduce client coverage area with demand, or maintain the area by reducing the amount of service each client receives.

Bounding the SRRA+C Problem

Four values bound the overall objective function in Equation 15, namely the respective upper and lower bounds of coverage shortfall and network flow. These provide an understanding of the limits to the possible improvement of any solution (though, this boundary may be infeasible).

At one extreme is "perfect" client coverage: every discrete grid square $(u, v) \in C$ receives an RSS of at least $\tau_{uv}$, so the coverage shortfall value is zero. At the other extreme, there is the exact opposite: no grid square receives any signal, so the coverage shortfall value is $$\sum_{(u,v)\in C} \tau_{uv}.$$

The lower bound on total delivered network flow $$\sum_d \sum_{i\neq d} S_i^d$$

is zero. The upper bound depends on the capacity of the given network with virtually no propagation loss between APs. (This is equivalent to placing all APs at essentially the same location.)

These four bounds provide a two-dimensional representation of the solution space. The horizontal axis represents the value of coverage, and the vertical axis represents the value of network flow. A solution on the left vertical axis has perfect coverage, and a solution on the upper horizontal axis has perfect network flow. Note that it is highly unlikely for a solution to appear at the upper-left corner of this bounded solution space. Such a "perfect" solution may consist of a very small coverage region receiving service from an over-abundance of co-located APs, or perhaps an arbitrary coverage region literally completely covered in APs.

Solving the SRRA+C Problem

Thus far, has been described how to quantify the value of a network using the SRRA+C formulation given AP locations, but not how to actually choose those locations. For a finite number of discrete AP locations, an exact method of solving the SRRA+C problem is through enumeration, i.e., trying all possible AP placement solutions which is inefficient.

Recall that the operating area (that area where APs may be placed and coverage may be desired) is discretized into a U×V grid. There are n total APs and the position of the first (the HQ node) is given, so the total number of unique AP locations σ is $$\binom{UV}{n-1}.$$

This exponential growth in both UV and n of the solution space makes for a very large number of solutions.

A faster, more efficient solution method is needed if SRRA+C is to be incorporated into the network design process. The DIRECT algorithm meets this need.

Dividing Rectangles Optimization

The DIviding RECTangles (DIRECT) algorithm is a sampling optimization algorithm. The algorithm requires no knowledge of the objective function gradient, which makes it appealing in solving the problem where the effects of terrain and radio propagation make for a very complex function. The algorithm iteratively samples points within the domain, choosing these points based on the unexplored territory of the function and the previously calculated sample function values. The algorithm stops after a defined number of iterations.

The DIRECT algorithm reaches a global optimum if the objective function is continuous. To meet this requirement, bilinear interpolation is used to create a continuous solution space from the discrete map data.

Bilinear Interpolation

Bilinear interpolation is a common image processing technique that utilizes the four nearest neighboring points to calculate the intensity (in this case, elevation) of a given point. The technique provides adequately smooth elevation information, without the added computational load of bicubic interpolation or splines.

Recall assume elevation E is a function of location uv. It is desirable to find the elevation of a point $E_{xy}$, indicated by a circle in FIG. 6. The four nearest known points are $(x_1, y_1)$, $(x_1, y_2)$, $(x_2, y_1)$, and $(x_2, y_2)$. Their corresponding function values (elevations) are $E_{x_1y_1}$, $E_{x_1y_2}$, $E_{x_2y_1}$, $E_{x_2y_2}$.

Figure 6:
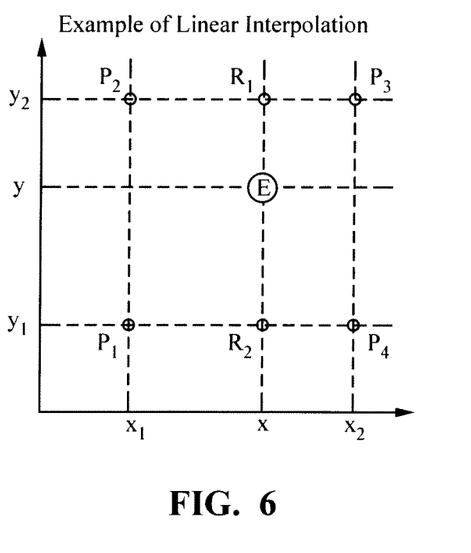
FIG. 6 illustrates an example of bilinear interpolation in accordance with one embodiment.

First interpolate in the x direction, to find the heights of the intermediate points $R_1$ and $R_2$, located at $(x, y_2)$ and $(x, y_1)$:

$$E_{xy_2} = \frac{x_2-x}{x_2-x_1}E_{x_1y_2} + \frac{x-x_1}{x_2-x_1}E_{x_2y_2}$$

$$E_{xy_1} = \frac{x_2-x}{x_2-x_1}E_{x_1y_1} + \frac{x-x_1}{x_2-x_1}E_{x_2y_1}.$$

Then interpolate in the y direction to determine the height of the desired interpolant Q:

$$E_{xy} = \frac{y_2-y}{y_2-y_1}E_{xy_1} + \frac{y-y_1}{y_2-y_1}E_{xy_2}.$$

Replacement yields:

$$E_{xy} = \frac{(x_2-x)(y_2-y)}{(x_2-x_1)(y_2-y_1)}E_{x_1y_1} + \frac{(x_2-x)(y-y_1)}{(x_2-x_1)(y_2-y_1)}E_{x_1y_2} + \frac{(x-x_1)(y-y_1)}{(x_2-x_1)(y_2-y_1)}E_{x_2y_2} + \frac{(x-x_1)(y_2-y)}{(x_2-x_1)(y_2-y_1)}E_{x_2y_1}.$$

The DIRECT Algorithm

The DIRECT algorithm iteratively divides the multidimensional solution space into smaller hyper-rectangles based on their potential optimality. To initialize the algorithm, each dimension of the solution space is normalized to have a lower bound of zero and an upper bound of one, creating a unit hyper-cube. The algorithm evaluates the function at the center of the hyper-cube. Next, the algorithm determines the set Π of potentially optimal hyper-rectangles/cubes. During the first iteration, there is one hyper-cube. The algorithm then samples each dimension of each element of Π at one-third the side-lengths of the largest dimension (in the case of a hyper-cube, all dimensions are sampled). The algorithm determines these locations by calculating $c \pm \delta e_i$, where c is the center point, δ is one-third the side-length of the largest dimension, and $e_i$, is the $i^{th}$ unit vector. This is demonstrated for two dimensions in FIGS. 7A and 7B.

Figure 7A:
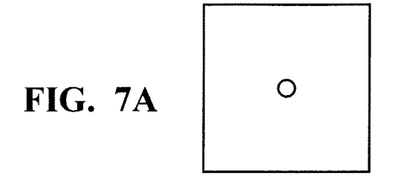
FIG. 7A illustrates sampling the center of a hyper-cube in accordance with one embodiment.
Figure 7B:
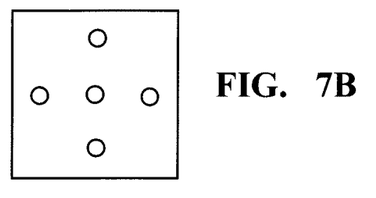
FIG. 7B illustrates sampling along each of the hyper-cubes longest dimensions in accordance with one embodiment.

In FIG. 7A, the algorithm samples the center of the hyper-cube. In FIG. 7B, the algorithm samples along each of the hyper-cube's largest dimensions (i.e., vertical and horizontal dimensions). Since the interval is a hyper-cube with equal length dimensions, the algorithm samples all dimensions.

Next, the algorithm computes $w_i$ (the smallest sampled value along each dimension) for each element of Π:

$$w_i = \min\{f(c+\delta e_i), f(c-\delta e_i)\} \forall i \in Q \qquad (18)$$

where Q is the set of the largest dimensions of a particular hyper-rectangle/cube, and $e_i$ is the ith unit vector. The dimension i with the smallest $w_i$ value contains the optimal function value. This point is placed in the largest sub-interval by first dividing the original hyper-rectangle/cube along the dimension with the smallest $w_i$. The process continues for the dimension with the next smallest $w_i$ value (see FIGS. 8A-8C).

Figure 8A:
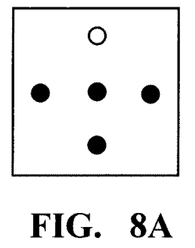
FIGS. 8A-C illustrate division of the initial hyper-cube in accordance with one embodiment.
Figure 8B:
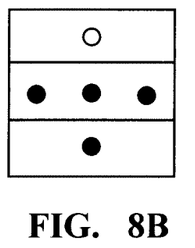
Figure 8C:
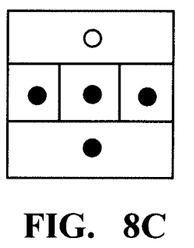

In FIG. 8A, the top sampled point (open dot) has the optimal objective value, so the vertical dimension contains the smallest $w_i$ value. In FIG. 8B, this dimension is divided first, and in FIG. 8C, the horizontal dimension is divided. The sampled points then become the centers of the new hyper-rectangles/cubes.

Following the division, the value of $f_{min}$ is updated, and the set $\Pi$ of potentially optimal hyper-rectangles/cubes is recalculated. The process continues until a predefined number of iterations or function evaluations has been reached.

The pseudo-code below outlines the DIviding RECTangles algorithm.

Algorithm DIRECT
Input: objective function $f$, number and size of dimensions of solution space, $\epsilon$ value, maximum number of DIRECT iterations and function evaluations
Output: Value and location of optimal solution found

```
begin
    Normalize solution space
    Calculate center c of hyper-cube
    Evaluate f at c ± δe_i for each dimension
    Set min_location = center of hyper-cube
    Set f_min = f(min_location)
    while (iteration < max_iterations and evaluations < max_evaluations) do
        if (iteration = 1)
            Add Φ(Δ_1) to set Π
        else
            Calculate set S of all Φ(Δ_i)
            Identify set Π using Algorithm Potentially Optimal
        end if;
        for (all j ∈ Π )
            Identify longest side(s) of hyper-rectangle/cube j
            Evaluate f at c ± δe_i for each longest dimension
            Increase evaluations
            Calculate w_i
            Divide j into smaller hyper-rectangles/cubes based on w_i
            Update f_min and min_location
        next j
        Increase iteration
    end;
    Convert min_location to original coordinate system
end.
```

Convergence

DIRECT is guaranteed to converge to the global optimum if the objective function is continuous. As the number of iterations goes to infinity, the size of the hyper-rectangles goes to zero, so DIRECT will eventually sample a point within an arbitrary distance of any desired point.

SRRA+C with DIRECT

In one embodiment, the DIRECT algorithm is used iteratively to choose AP locations for solving the SRRA+C problem. The solution space is defined by the operating area in the form of terrain data. The DIRECT algorithm requires this area to be in the shape of a rectangle or square, to facilitate transformation into a unit hyper-cube.

The dimensionality of the problem follows from the number of APs that can move, (n−1). Each moving (i.e., non-HQ) AP has an associated (u, v) location bounded by the operating region, so both of these dimensions must be considered for each AP. Hence, the number of dimensions is 2(n−1). A point in this solution space represents (u, v) coordinates for every AP.

Hierarchical Decomposition

Figure 9:
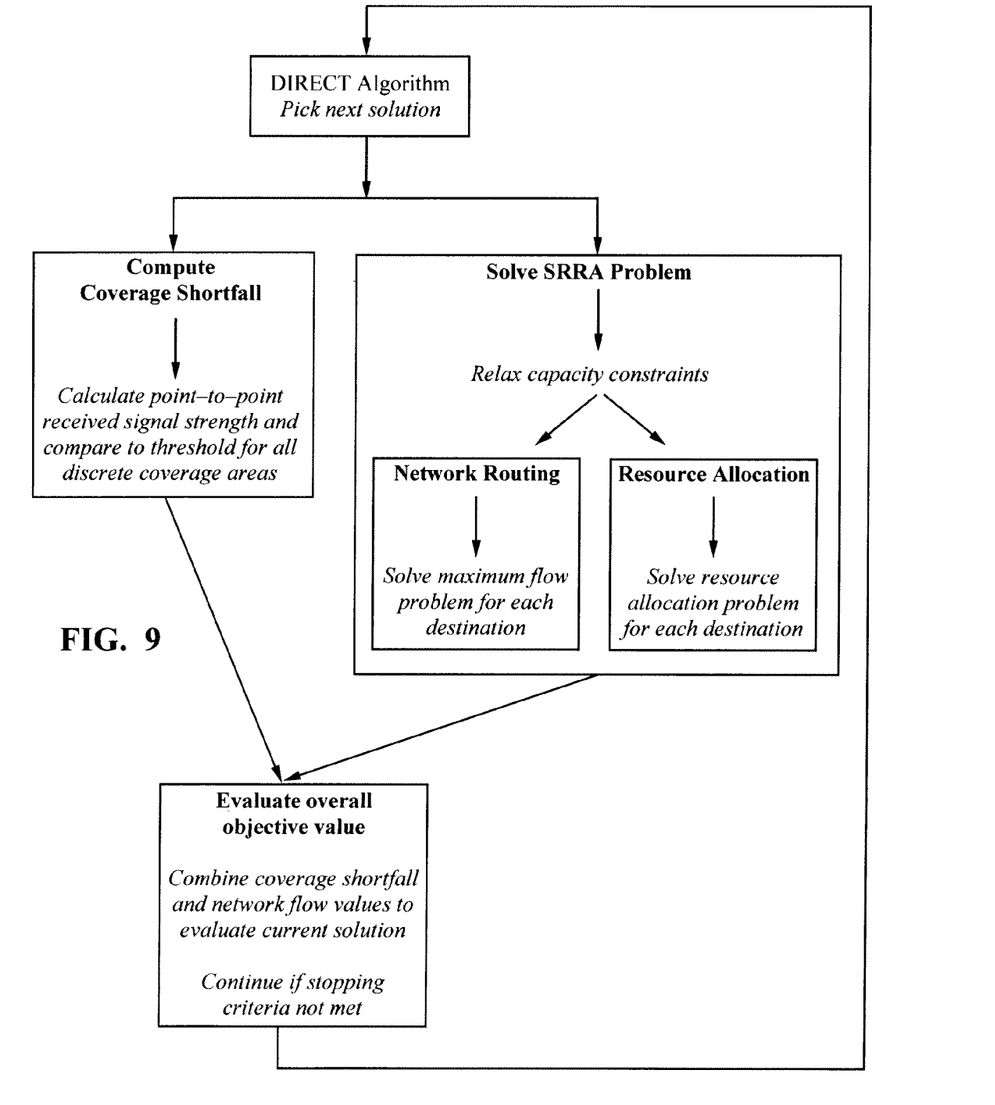
FIG. 9 illustrates the method of the invention showing hierarchical decomposition of SRRA+C solved with a division of rectangles algorithm in accordance with one embodiment.

FIG. 9 summarizes the hierarchal method of solving the SRRA+C problem. For each iteration of DIRECT, the algorithm chooses a set of AP locations σ. Compute coverage shortfall and the SRRA solution for these locations, and combine the values into the overall objective function value $\Omega(\sigma)$.

The process continues until the desired stopping criterion is reached. Possible criteria include elapsed time, size of interval side length, and number of iterations since last objective value improvement or change in AP locations. In one embodiment, a desired number of DIRECT iterations is used.

SRRA+C with DIRECT Algorithm

The following pseudo-code outlines the SRRA+C process utilizing the DIRECT algorithm.

Algorithm SRRA+C with DIRECT
Input: Number and characteristics of APs, desired coverage region, HQ node location, minimum flow requirement, map data, DIRECT stopping criteria, and $\epsilon$ value (for DIRECT).
Output: WMN value; location, traffic routing and power allocations for all APs; client received signal strength at each discrete map location (u, v).

```
begin
    Store map data
    while (DIRECT stopping criterion not true) do
        Calculate AP locations using Algorithm DIRECT
        Calculate coverage shortfall value
        Calculate network flow values using Algorithm SRRA
        Calculate overall objective value
    end;
end.
```

SRRA+C Decision Support Tool

To solve the SRRA+C problem, in one embodiment, a graphical user interface (GUI) is created in Microsoft Visual C++ (Microsoft Corporation, 2009). The stand-alone program reads text files in a generic XYZ format as input for terrain elevations. This map information can be of any scale and any grid-based format (e.g., Universal Transverse Mercator (UTM) coordinate system). The tool allows the user to change all input data described in the formulation.

The program allows three different modes of radio propagation (inverse-square, Hata COST-231, and TIREM). The TIREM model is accessed via a dynamic link library (DLL) provided by the U.S. Joint Spectrum Center. The program can solve the SRRA+C problem using either enumeration or the DIRECT algorithm.

The program has two operating modes. The first is a Coverage Analysis mode, used to solve the SRRA+C problem as described. The user is able to input all required variables, including drawing the coverage region directly on a graphical display of the terrain map.

After solving the problem, the programs display the locations of APs and their associated links, and the areas in the coverage region receiving adequate client coverage graphically on the map. AP locations are indicated by transmitter icons, and calculated traffic flow links are indicated by lines connecting APs. Within the defined coverage region, green/lighter area indicates adequate coverage and red/darker area indicates coverage shortfall.

The other operating mode is a Point-to-Point Analysis mode. This mode is used to compute point-to-point losses, received signal strengths, and theoretical link capacities between any two points. This analysis mode is useful for examining proposed site locations, as well as tuning the inputs of the Coverage Analysis mode to provide desired output.

SRRA+C Model Validation

The validity of the SRRA+C formulation, specifically its ability to quantify network performance, rests on the accuracy of radio wave propagation and network throughput predictions. Each part of the overall objective function depends on the algorithms associated with these predictions. The client coverage portion of the formulation relies directly on received signal strength, a function of radio wave propagation. Network throughput depends on received signal strength and the capacity formula of Equation 3. Field tests provide validation for each algorithm.

Validation of Client Coverage Model: Received Signal Strength Test

In one embodiment, received signal strength is used to calculate both client coverage and the traffic capacity between APs. While the Hata COST-231 model can provide a usable approximation of radio propagation, in one embodiment, the criticality of accuracy inclines the use of TIREM for all tests. Though TIREM is computationally more expensive than COST-231, in practice the runtime differences are negligible.

TIREM predicts radio propagation between two points, given a profile of elevations between the points. The model has proven its value in many government and commercial modeling applications, but it does have its limitations. It does not account for foliage, rain, man-made obstacles, and any obstacles not directly in the path between the two given points. Nor does it account for any long-term variability; the predictions are strictly deterministic. For line-of-sight calculations, the difference between TIREM predictions and actual measurements has been show to have a mean of −2.8 dB and a standard deviation of 8.9 dB. Considering all the variables contributing to propagation physics, this level of variation is very reasonable.

Figure 10:
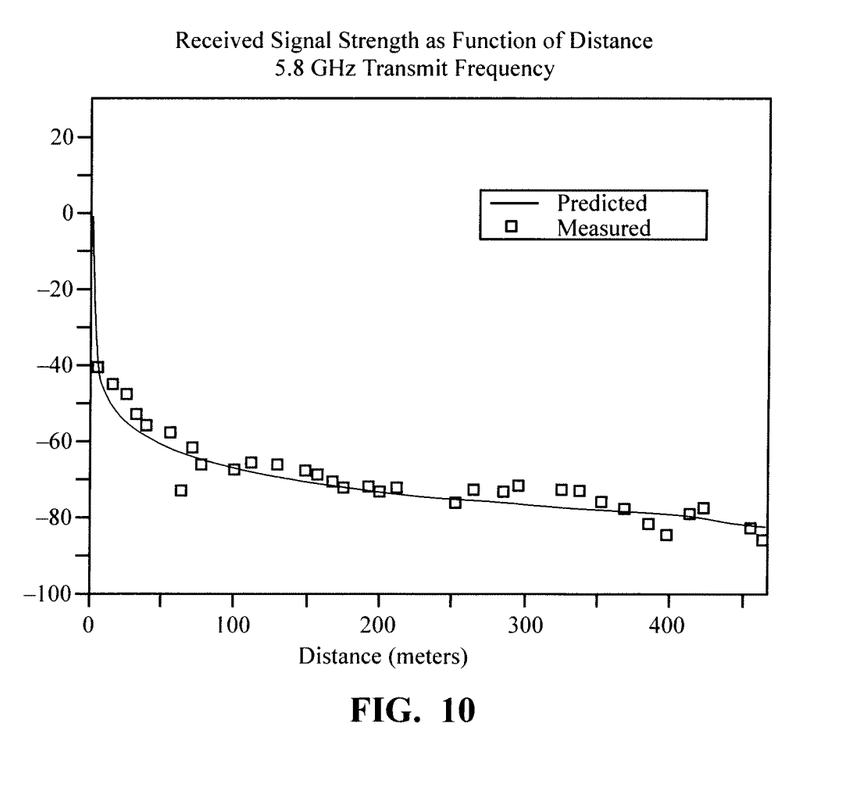
FIG. 10 graphically illustrates calculated received signal strength resulting from a 5.8 GHz transmit frequency as a function of distance compared to actual measurements using a WMN formed using the method of the present invention in accordance with one embodiment.

In one embodiment, a first test is conducted at the 5.8 GHz operating frequency. Collect n=200 observations from 0 to 466 meters. Using a fade margin of 10 dB, compute the differences between TIREM predictions and actual observations, and find the mean of these differences to be −0.64 dB and the standard deviation to be 4.97. FIG. 10 illustrates the results of this field test.

Figure 11:
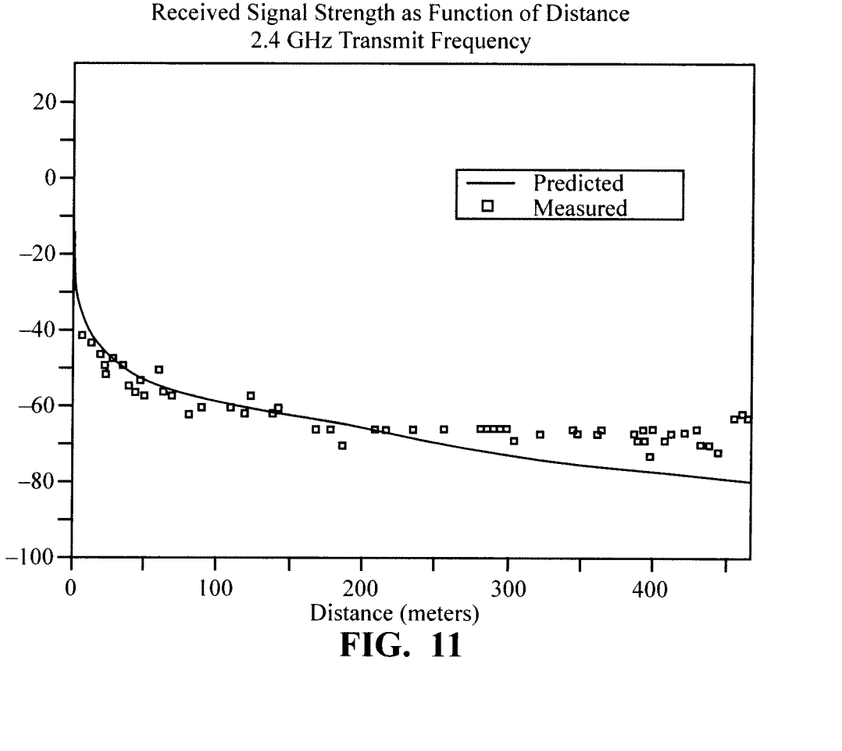
FIG. 11 graphically illustrates calculated received signal strength resulting from a 2.4 GHz transmit frequency as a function of distance compared to actual measurements using a WMN formed in accordance with one embodiment.

Conduct a similar test at the 2.4 GHz operating frequency. Collect n=165 observations from 0 to 464 meters. The mean of the differences is −2.65 dB and the standard deviation to be 7.56. FIG. 11 illustrates the results of this field test.

These two tests demonstrate that TIREM is capable of making very reasonable received signal strength predictions using the testing equipment in a real-world environment. Since the formulation of client coverage depends on received signal strength, this formulation is an acceptable method of valuing coverage.

In one embodiment, the process may be embodied as a computer program product. A computer program product includes a medium configured to store or transport computer readable code or data, or in which computer readable code or data may be embedded. Some examples of computer program products are CD-ROM disks, ROM cards, floppy disks, magnetic tapes, computer hard drives, and servers on a network.

In one embodiment, the process may be embodied in a computer based apparatus allowing for input of data into the process and receipt of output from the process, i.e., wireless mesh network design(s).

This disclosure provides exemplary embodiments of the invention. The scope of the invention is not limited by these exemplary embodiments. Various embodiments, whether explicitly provided for by the specification, or implied by the specification or not, may be implemented by one of skill in the art in view of this disclosure. Thus, although various operations of the process are described in an exemplary order, those of skill in the art can recognize that other orders of operations are possible without departing from the scope of the invention.

What is claimed is:

1. A computer-implemented method for forming a wireless mesh network that includes a plurality of access points arranged to provide radio communications with a plurality of client devices comprising:

a computer-based apparatus including non-transitory computer readable code for a method for forming a wireless mesh network, when implemented by the computer-based apparatus, the method comprising:

(a) receiving inputs of criteria for a minimum client coverage threshold, a network signal flow weight, the network signal flow weight being a positive scalar representing the relative weight placed on network signal flow, and a stopping criterion, for the wireless mesh network;

(b) receiving an input of an operating region as a two-dimensional topographic area where access points may be placed, the operating region containing an infinite number of potential access point locations;

(c) receiving an input of one or more coverage regions where client coverage is desired, wherein the one or more coverage regions and the operating region need not be the same;

(d) receiving an input of a minimum coverage threshold for each coverage region for a client to connect to an access point in the operating region;

(e) determining an initial partition of the operating region and an associated arrangement of access points in the operating region based on the dimensions of the operating region, the associated arrangement of access points being selected from the potential access point locations;

(f) calculating a client coverage value at each coverage region;

(g) comparing the calculated client coverage value to the minimum client coverage threshold for each coverage region to determine a calculated coverage shortfall value;

(h) determining an optimal signal routing and an optimal power allocation for each access point to determine a calculated network signal flow value;

(i) inputting the calculated coverage shortfall value for each coverage region and the calculated network signal flow value into a weighted multiple-objective optimization function which utilizes the network signal flow weight, to determine an overall objective value associated with that arrangement of access points, and storing the overall objective value; and (j) determining if the stopping criterion is met, and wherein if the stopping criterion is not met, selecting a next partition of the operating region and an associated arrangement of access points based on the overall objective values of all previously determined arrangements of access points and repeating operations (f)-(j); and wherein if the stopping criterion is met, selecting the arrangement of access points associated with the minimal objective value of the multiple-objective optimization function of those previously stored, and providing as output the associated arrangement of access points as a wireless mesh network design.

2. The computer-implemented method of claim 1 wherein the stopping criterion is a selected number of iterations of operations (f)-(j).

* * * * *